US 6,661,573 B1

(12) United States Patent
Davis

(10) Patent No.: US 6,661,573 B1
(45) Date of Patent: Dec. 9, 2003

(54) INFRARED MICROSCOPE ADAPTER FOR VIEWING AT AN ANGLE

(75) Inventor: Jeffrey R. Davis, Weymouth, MA (US)

(73) Assignee: Digilab, LLC, Randolph, MA (US)

( * ) Notice: Subject to any disclaimer, the term of this patent is extended or adjusted under 35 U.S.C. 154(b) by 0 days.

(21) Appl. No.: 09/956,259

(22) Filed: Sep. 17, 2001

(51) Int. Cl.[7] .............................................. G02B 21/00
(52) U.S. Cl. ........................ 359/381; 359/368; 359/829
(58) Field of Search ................................. 359/368, 372, 359/381, 433, 827, 828, 829, 831

(56) References Cited

U.S. PATENT DOCUMENTS

| | | | | |
|---|---|---|---|---|
| 4,192,591 A | * | 3/1980 | Yobaccio ..................... | 396/17 |
| 5,089,909 A | * | 2/1992 | Kleinberg ................... | 359/363 |
| 5,253,106 A | * | 10/1993 | Hazard ....................... | 359/368 |
| 5,349,468 A | * | 9/1994 | Rathbone et al. ........... | 359/390 |
| 5,818,637 A | * | 10/1998 | Hoover et al. .............. | 359/381 |
| 5,959,770 A | * | 9/1999 | Perkins et al. .............. | 359/422 |

* cited by examiner

Primary Examiner—Mark A. Robinson
(74) Attorney, Agent, or Firm—Scully, Scott, Murphy & Presser

(57) ABSTRACT

An adapter is interposed between the objective and the microscope. The adapter has a support structure to which are mounted an objective-engaging structure, a microscope-engaging structure, and a reflecting element. The objective-engaging structure and the microscope-engaging structure, when mounted to the support structure, are characterized by respective axes that are non-collinear, and the reflecting element is positioned and oriented so that light incident along the objective-engaging structure's axis is reflected to travel along the microscope-engaging structure's axis. The relative angle between the axes is preferably 90 degrees. A user mounts the adapter to the microscope and the objective to the adapter, at which point, the microscope is capable of viewing a sample at an angle displaced from the vertical. In the specific example of a 90-degree angle, a sample of any size can be viewed merely by bringing the sample beside the microscope and in front of the objective.

14 Claims, 5 Drawing Sheets

INFRARED MICROSCOPE ADAPTER FOR VIEWING AT AN ANGLE

CROSS-REFERENCES TO RELATED APPLICATIONS

Not Applicable

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK

NOT APPLICABLE

BACKGROUND OF THE INVENTION

The present invention relates generally to optical instruments, and more specifically to infrared microscopes such as used for Fourier transform infrared spectroscopy (FT-IR).

Infrared microscopes are known, and the technology is well developed. A representative infrared microscope, marketed under the UMA 600 mark, is available from Bio-Rad Laboratories, Inc., Hercules, Calif. (Digilab Division, Randolph, Mass.). The infrared microscope is typically used with an FT-IR spectrometer, also available from Bio-Rad Laboratories. Also, it is well known that the microscope objective is normally removable from the microscope to enable the use of many different types of objective.

The typical infrared microscope setup has a an objective spaced above a sample stage with the objective facing downwardly, and the microscope is operated in transmission mode or reflection mode, depending on the particular properties of the sample that are to be measured. In transmission mode, the infrared light is directed upwardly through a condenser, which focuses the light on the sample. Light passing through the sample and emanating from the sample plane is collected by the objective, and the light travels along an optical train to an infrared detector. In a reflectance measurement, the infrared light is directed downwardly through the objective to encounter the sample from above, and light reflected from the sample is collected by the objective and detected as outlined above.

Infrared microscopy, especially when performed in conjunction with an FT-IR spectrometer, has been used to analyze a vast array of samples. The main constraint on the sample is that it be sufficiently small to fit on the sample stage. When analysis of a large body of material is required, small amounts of material are removed and placed on the sample stage for analysis. This may not be a feasible or desirable treatment for such samples as a valuable painting, a ceramic, or a vehicle tire.

One prior art approach to allow viewing of a sample in a sideways direction has been to design a turret having its axis of rotation at a 45-degree angle to the vertical axis and providing objective mounting threads to allow a given objective to assume a vertical orientation in normal operation or a horizontal orientation for sideways viewing. The microscope incorporates a movable mirror that is moved from one position to the other when the turret is rotated. This works in its intended way for microscopes designed to provide the sideways viewing capability, but the mechanism must be incorporated into every microscope at the time of manufacture, and is not available for pre-existing microscopes that were not built with this capability.

BRIEF SUMMARY OF THE INVENTION

The present invention provides a sideways viewing capability to microscopes, including microscopes that were not originally manufactured with such capability. Therefore, the invention overcomes the requirement, in at least some microscopes, that a sample be small, or that a small portion be removed from a larger sample, thereby allowing large samples to be tested non-destructively. Thus it is possible for a manufacturer to configure the microscope without the sideways viewing capability, and allow users needing such capability to easily retrofit the microscope to add the capability.

In short, the invention contemplates interposing an adapter between the objective and the microscope. The adapter has a support structure to which are mounted an objective-engaging structure, a microscope-engaging structure, and a reflecting element. The objective-engaging structure and the microscope-engaging structure, when mounted to the support structure, are characterized by respective axes that are non-collinear, and the reflecting element is positioned and oriented so that light incident along the objective-engaging structure's axis is reflected to travel along the microscope-engaging structure's axis. In specific embodiments, the relative angle between the axes is 90 degrees.

Thus, when the adapter is mounted to the microscope and the objective is mounted to the adapter, the microscope is capable of viewing a sample at an angle displaced from the vertical. In the specific example of a 90-degree angle, a sample of any size can be viewed merely by bringing the sample beside the microscope and in front of the objective.

Accordingly, the invention provides an adapter and a method of retrofitting microscopes to provide a sideways viewing capability.

A further understanding of the nature and advantages of the present invention may be realized by reference to the remaining portions of the specification and the drawings.

DETAILED DESCRIPTION OF THE INVENTION

Figure 1:
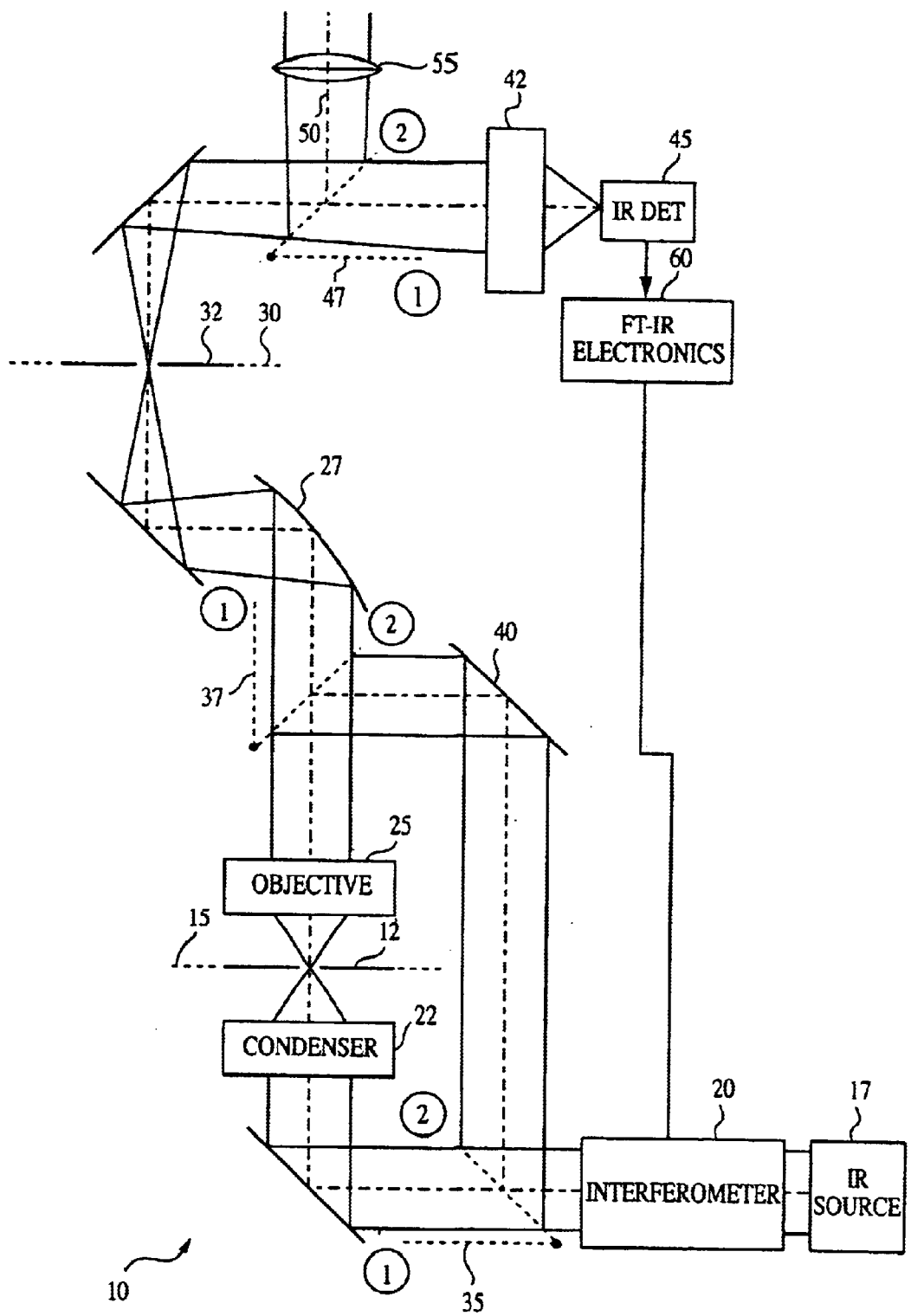
FIG. 1 is a schematic optical view showing a prior art infrared microscope system suitable for use in connection with the invention.

FIG. 1 is a schematic optical view showing a representative prior art infrared microscope system 10. The system optionally incorporates the functionality of an FT-IR spectrometer for the purpose of performing FT-IR analysis of a sample mounted on a sample stage 12 in a sample plane 15. The figure shows a particular orientation, and for convenience, directional references will be made with respect to the illustrated orientation. Infrared light from an infrared source 17, typically modulated by an interferometer 20, is directed to the sample. The illustrated microscope can be operated in transmission and reflection modes.

In transmission mode, the infrared light is directed upwardly through the sample. To this end, the infrared light is directed to a condenser 22, which brings the infrared light to a focus in the sample plane. Light emanating from the sample plane is collected by an infrared objective 25, which collimates the light and directs it to a curved mirror 27, which focuses the light in an image plane 30 which typically has a sample mask 32 for limiting the field of view.

In a reflectance measurement, the infrared light is directed downwardly through the objective to encounter the sample from above. The infrared light is directed into a portion of the objective's aperture, and the light emanating from the sample is collected by the remaining portion of the objective's aperture. This is effected by having mirrors 35 and 37, shown in phantom, selectively interposed in the optical train. These mirrors are movable between respective first positions, denoted by respective circled numerals 1, and respective second positions, denoted by respective circled numerals 2. In their first positions, mirrors 35 and 37 light do not intercept light from interferometer 20, and the light is directed to objective 22 to provide transmission mode operation. When movable mirrors 35 and 37 are in their second positions, denoted by respective circled numerals 2, light from interferometer is directed to objective 25 to provide reflection mode operation. A fixed folding mirror 40 is shown interposed between movable mirrors 35 and 37.

In either transmission mode or reflection mode, the light emerging from the image plane is then directed to a second objective 42, which focuses the light on an infrared detector 45.

A mirror 47, shown in phantom, is movable between first and second positions, denoted by circled numerals, with the first position allowing the light to reach the infrared detector and the second position deflecting the light to an alternate path 50. In the prior art infrared microscope, a viewing element such as a camera or binocular viewer would be disposed in path 50. This is shown schematically as a lens 55. To accommodate the viewing functionality, a visible light source would be selectively coupled into the IR path by another moveable mirror (not shown), and mirror 47 moved into the second position to deflect visible light onto path 50. The capability of coupling viewing radiation into the infrared microscope path and the capability of coupling the infrared source above or below the objective are well known and will not be described further. Some background information on this subject is found in U.S. Pat. No. 5,295,017 to Brown for "Sample Masking Using Wavelength-Selective Material," hereby incorporated by reference. Further, in accordance with known practice, a number of flat folding mirrors are interposed in the path for making the microscope more compact.

Interferometer 20 and infrared detector are coupled to control and analysis electronics, shown collectively as an FT-IR electronics block 60. The control of the interferometer and the processing of the infrared detector signal are not part of the invention and will not be described in detail here. U.S. Pat. No. 5,166,749 to Curbelo et al. for "Step Scanning Technique for Interferometer", and U.S. Pat. No. 5,262,635 to Curbelo for "Techniques for Correcting Non-Linearity in a Photodetector Using Predefined Calibration Information" provide relevant background information and are hereby incorporated by reference.

It is also possible to provide a dichroic beam splitter (dichroic filter) having a fixed position in the path corresponding to the second position of movable mirror 47. This dichroic beam splitter would pass infrared light to the infrared detector and reflect visible light onto path 45. Such a dichroic beam splitter could be used as a substitute for the movable mirror. In the description that follows, references to movable mirror 47, as well as other movable mirrors in other embodiments should be taken to include the possibility of a fixed beam splitter (dichroic or otherwise).

The infrared objectives (including condenser 22) are typically reflective Schwartzchild objectives, each comprising convex and concave spherical mirrors. Some particular infrared objectives have 15× or 36× magnification, but other magnifications can be used. The range of possible other types of objectives is well known to those skilled in the art and will not be discussed further.

Figure 2A:
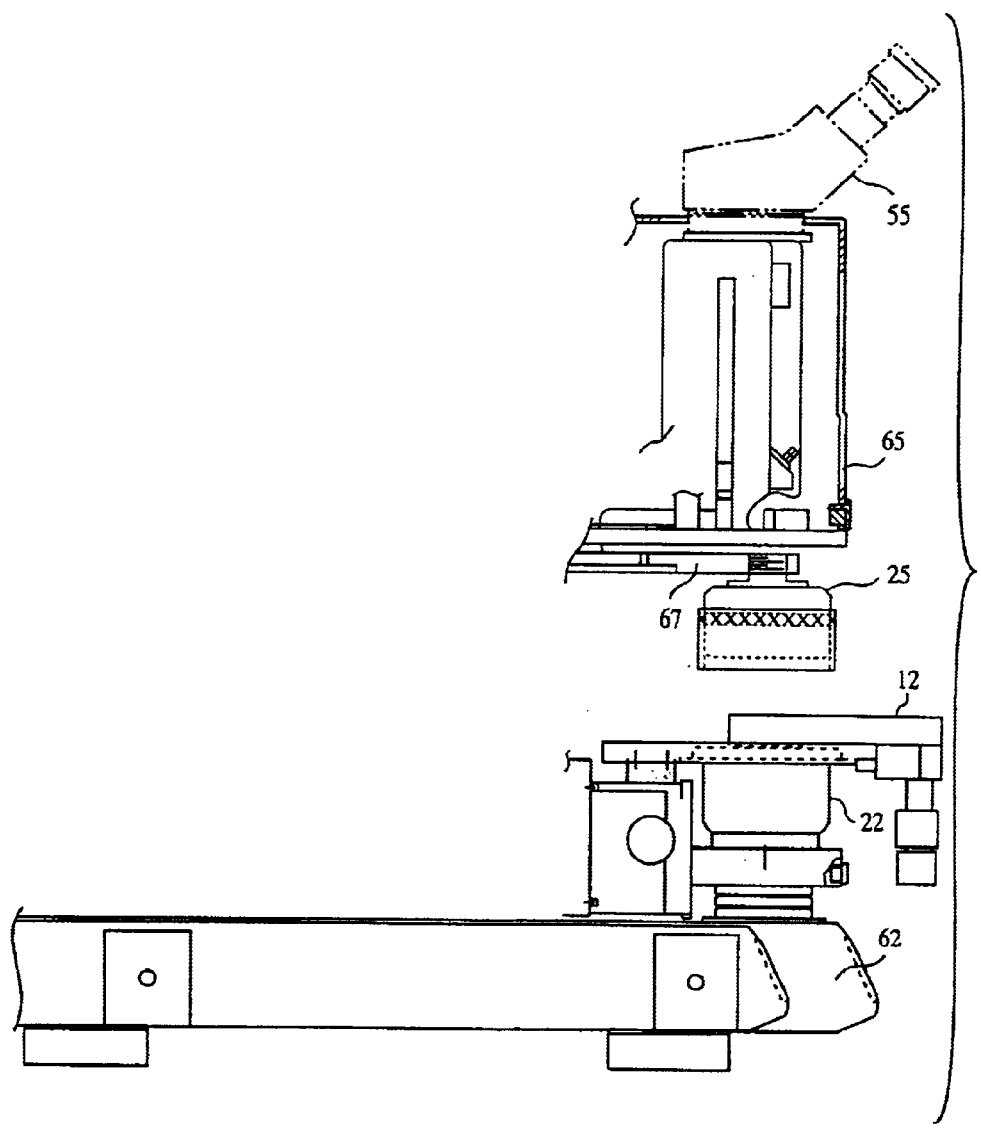
FIG. 2A is a fragmentary side elevational view showing portions of a prior art infrared microscope including the portion where the objective is mounted.

FIG. 2A is a fragmentary side elevational view showing portions of a representative prior art infrared microscope. As can be seen, sample stage 12 and condenser 22 are mounted to the microscope's base 62, while objective 25 is mounted to the microscope's superstructure 65. Objective 25 is shown as being threadably engaged with a portion 67 of the microscope structure. In principle other types of connection such as bayonet mounts and dovetail recess mounts could be used. However, virtually all microscope objectives use threads in accordance with ASME Screw Thread Standard B1.11-1958(R1994). This standard covers the screw thread used for mounting the objective assembly to the body or lens turret of microscopes. It is based on, and intended to be interchangeable with the screw thread introduced and adopted many years ago by the Royal Microscopical Society of Great Britain, generally known as the RMS thread and now almost universally accepted as the basic standard for microscope objective mountings.

Figure 2B:
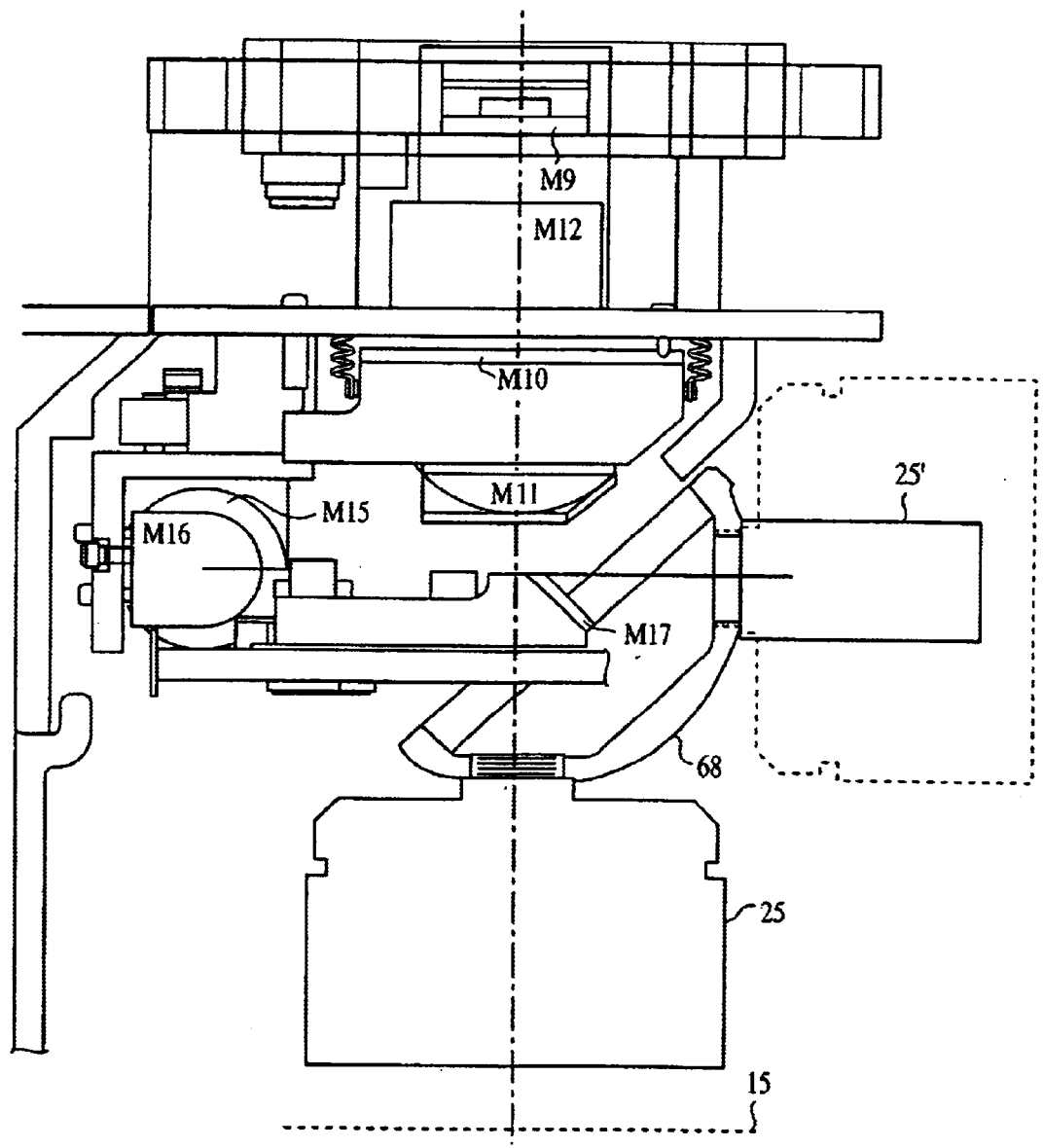
FIG. 2B is a fragmentary side elevational view showing portions of a prior art infrared microscope including a turret to which multiple objectives are mounted.

FIG. 2B is a fragmentary side elevational view showing portions of a representative prior art infrared microscope that has been provided with a turret 68 and a movable mirror system that allows viewing samples from the side. In the drawing, the turret is shown as having infrared objective 25 in its normally downward facing orientation and a small visible objective, designated 25'. Objective 25' is typically low magnification and is used to visually locate the region of interest before switching to the reflecting infrared objective for final focusing, sample centering, and measuring in the infrared. The turret would be rotated so that the visible objective would face downwardly to view the sample on the stage.

The figure shows a number of mirrors, designated M9, M10, M11, M12, M15, M16, and M17. Mirrors M9, M10, M11, and M12 perform the function of bringing light from the objective in transmission or reflection mode to the detector (or eyepiece). In reflection mode, mirror M17 directs the illumination from the lower half of mirror M16 down to the objective. In transmission mode, mirror M17 is moved out of the path so that light traveling upwardly through the sample and passing through the objective can reach mirror M11.

In order to effect sideways viewing (either through visible objective 25' in its horizontal orientation as shown in the figure or through infrared objective 25 as shown in phantom in the figure), mirror M17 is moved slightly to the left of the position shown so that its right surface is moved into the plane previously occupied by its left surface is in the figure. Then, the right surface of M17 reflects the light coming from the horizontally disposed objective so as to travel up toward the detector or eyepiece. The horizontally disposed objective is illuminated by the top half of the beam from mirror M16, which passes above mirror M17. Although this arrangement effects sideways viewing, it requires extra movable components in the microscope, and this mechanism must be provided in all units, whether the user needs the capability or not.

Figure 3:
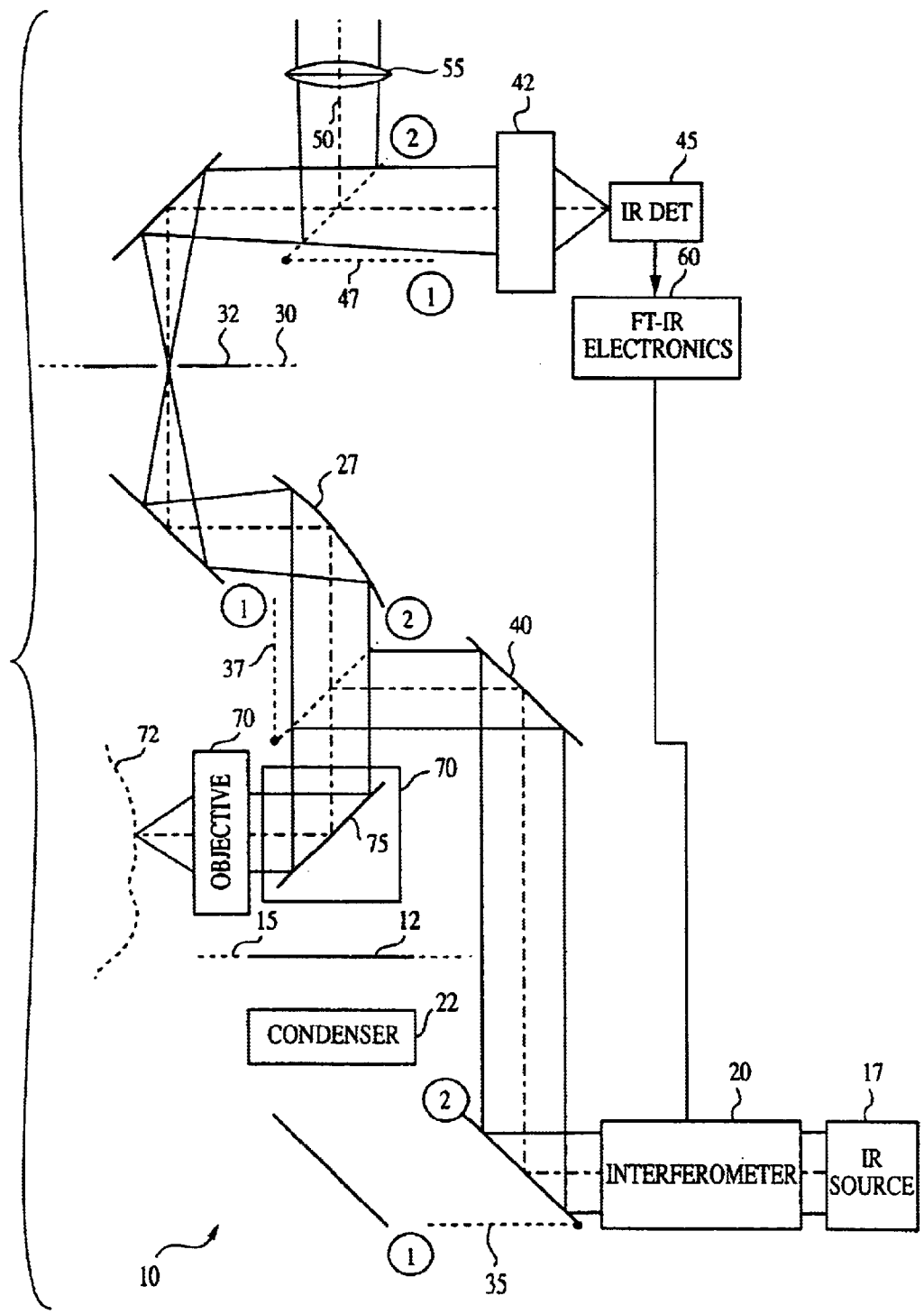
FIG. 3 is a schematic optical view showing an infrared microscope system fitted with an adapter that allows sideways viewing according to the invention.

FIG. 3 is a schematic optical view showing infrared microscope system 10 fitted with an adapter 70 that allows sideways viewing of an arbitrarily sized sample 72. The adapter is used with the microscope in reflection mode, and to that end, movable mirrors 35 and 37 are shown in their respective second positions, namely in the beam path (being drawn as solid lines). As will be described in detail below, the adapter is configured so that the objective can be mounted to the adapter, and the adapter can be mounted to the microscope. Adapter 70 includes a reflecting element 75, which in the specific embodiment is disposed to provide a deflection of 90 degrees. In a particular implementation, objective 25 is infinity corrected, which means that the light emerging from the objective after reflection by the sample is collimated. Thus, there is no need to modify the optical system of the microscope to account for the fact that the adapter increases the optical path between objective 25 and curved mirror 27.

Figure 4A:
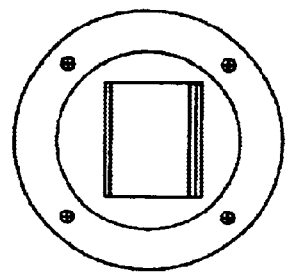
FIGS. 4A, 4B, and 4C are respective top, side, and bottom views of an embodiment of the adapter according to the invention.
Figure 4B:
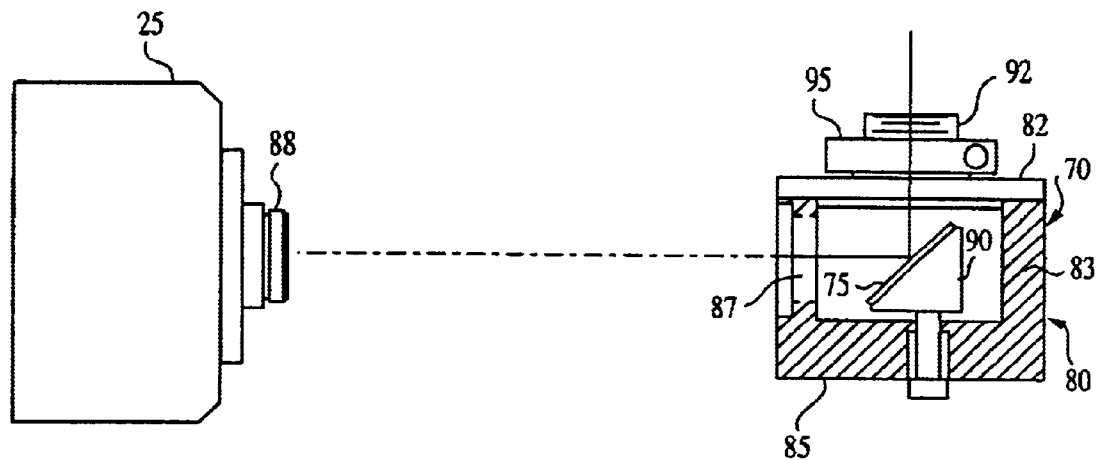
Figure 4C:
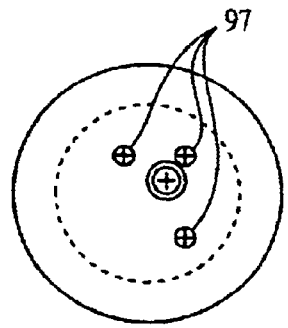

FIGS. 4A, 4B, and 4C are top, side, and bottom views, respectively of a specific embodiment of adapter 70. Some of the views are partially cutaway for clarity. FIG. 4B includes objective 25 before it is engaged with the adapter. The adapter includes a housing with a lower portion 80 and a cover 82. Lower portion 80 includes a cylindrical wall 83 and a flat bottom 85. Wall 83 is formed with a threaded aperture 87 configured to accept complementary male threads 88 on objective 25. Bottom 85 supports reflecting element 75, which in this case is a mirror made of glass with an aluminized reflective surface. The reflecting element is mounted to a prism-shaped support 90 that maintains the reflecting element at an angle of 45 degrees from the horizontal and vertical axes. Cover 82 carries an externally threaded stem 92 configured to engage complementary female threads on the portion of the microscope to which the objective is normally mounted.

Stem 92 may be a separate element that is fastened (e.g., by welding or soldering) to cover 82, or it may be integrally formed. The stem carries a lock collar 95, which is threaded onto stem 92 and formed with a slot and provided with a screw so that it can be, in effect, clamped in a desired position along the stem. This makes it possible to achieve the proper angular position of adapter 70 when the threaded stem is screwed into the microscope. Adjusting screws 97 are provided on the bottom to provide an alignment where the reflected beam exiting aperture 87 is collinear with the objective's optical axis.

Threaded aperture 87 and threaded stem 92 are characterized by respective screw axes, the included angle between which defines the angle at which the objective is oriented relative to the microscope's normally vertical axis. As mentioned above, 90 degrees is preferred, but some applications could dictate another angle and the invention is not limited to a specific deflection angle.

In conclusion, it can be seen that the present invention provides a deceptively simple and elegant solution to a problem that has limited the utility of infrared microscopes. While prior art microscopes have had the capability of sideways viewing, that capability had to be built into the microscope, and all units needed to be so configured. The present invention allows microscopes lacking a sideways viewing capability to be retrofitted, thereby extending the usefulness of such microscopes.

While the above is a complete description of specific embodiments of the invention, various modifications, alternative constructions, and equivalents may be used. For example, as mentioned above, the specific embodiment uses a microscope with an infinity-corrected objective. This has the advantage of allowing different optical path length between objective 25 and focusing mirror 27 with no effect on the optical performance of the system. However, the invention is also applicable to the case of finite tube length objectives. In such a case, curved mirror 27 would be dispensed with, and the objective would form the image on aperture 32 in plane 30. The use of the invention in this case could result in a small difference in the path length between the objective and aperture 32, with a resulting small change in the magnification created by the objective. Known techniques can be used to adjust the objective for the different tube length.

Therefore, the above description should not be taken as limiting the scope of the invention as defined by the claims.

What is claimed is:

1. An adapter for use with an infrared microscope that is configured with an objective-engaging structure that engages a complementary microscope-engaging structure on a removable infrared objective, the adapter comprising:

a removable support structure for mounting between the objective and the microscope;

an objective-engaging structure, mounted to said support structure;

a microscope-engaging structure mounted to said support structure for engaging to said infrared microscope; and a reflecting element mounted to said support structure;

said objective-engaging structure and said microscope-engaging structure, when mounted to said support structure, are characterized by respective axes that are non-collinear, said reflecting element being positioned and oriented so that infrared light incident along said objective-engaging structure's axis is reflected to travel along said microscope-engaging structure's axis, whereby the adapter engages the objective by the same method that the microscope engages the objective.

2. The adapter of claim 1 wherein said objective-engaging structure of said adapter is a set of female threads formed to engage an objective whose microscope-engaging structure is a set of complementary male threads.

3. The adapter of claim 1 wherein said microscope-engaging structure of said adapter is a set of male threads formed to engage a microscope, the objective-engaging structure of which is a set of complementary female threads.

4. The adapter of claim 1 wherein said objective-engaging structure and said microscope-engaging structure are complementary with each other.

5. The adapter of claim 1 wherein said objective-engaging structure's axis and said microscope-engaging structure's axis are at 90 degrees from each other.

6. For use with an infrared microscope having an optical train that cooperates with a removable infrared objective, the objective having a first engagement structure that engages a second complementary engagement structure on the microscope for registering the objective to the microscope, an adapter comprising:
- a removable support structure for mounting between the objective and the microscope;
- a first adapter structure, mounted to said support structure and configured to mate with the first engagement structure on the objective;
- a second adapter structure, mounted to said support structure and configured to mate with the second engagement structure on the microscope; and
- a reflecting element mounted to said support structure; said first and second adapter structures and said mirror being oriented and positioned so that when said first adapter structure mates with the first engagement structure, and said second adapter structure mates with the second engagement structure, infrared light collected from the objective encounters said reflecting element at a non-zero incident angle, is reflected by said reflecting element, and enters the microscope so as to travel along the optical train of the microscope.

7. The adapter of claim 6 wherein said first adapter structure is a set of female threads formed to engage an objective whose first engagement structure is a set of complementary male threads.

8. The adapter of claim 6 wherein said second adapter structure is a set of male threads formed to engage a microscope whose second engagement structure is a set of complementary female threads.

9. The adapter of claim 6 wherein said first and second adapter structures are complementary to each other.

10. The adapter of claim 6 wherein said incident angle is 45 degrees so that when the objective is mounted to the adapter and the adapter is mounted to the microscope, the optical axis of the objective is at 90 degrees from the optical axis of the microscope.

11. A method of examining a sample with an infrared microscope that is configured with a removable infrared objective, the microscope having an objective-engaging structure that engages a complementary microscope-engaging structure on the objective, the method comprising the steps of:
- providing an adapter for mounting between the infrared objective and the microscope, the adapter comprising a removable support structure to which is mounted an objective-engaging structure, a microscope-engaging structure, and a reflecting element,
- the adapter's objective-engaging structure and microscope-engaging structure being characterized by respective axes that are non-collinear, and the reflecting element is positioned and oriented so that infrared light incident along the adapter's objective-engaging structure's axis is reflected to travel along the adapter's microscope-engaging structure's axis;
- engaging the adapter's microscope-engaging structure with the microscope's objective-engaging structure; and
- engaging the adapter's objective-engaging structure with the objective's microscope-engaging structure;
  - whereby, once the objective, the adapter, and the microscope are so engaged, the objective faces at an angle from the vertical by virtue of the respective axes being non-collinear.

12. The method of claim 11 wherein said objective-engaging structure's axis and said microscope-engaging structure's axis are at 90 degrees from each other, whereby the microscope, with the objective and adapter so engaged, can be used to view samples from the side.

13. A method for adapting an infrared microscope for viewing a sample from the side, the microscope configured with a removable infrared objective, the microscope having an objective-engaging structure that engages a complementary microscope-engaging structure on the objective, the method comprising the steps of:
- disengaging the objective from the microscope;
- engaging an adapter to the microscope, the adapter comprising
  - a removable support structure;
  - an objective-engaging structure, mounted to said support structure;
  - a microscope-engaging structure mounted to said support structure for engaging to said infrared microscope; and
  - a reflecting element mounted to said support structure; and
- engaging the objective to the adapter at the objective-engaging structure.

14. The method of claim 13 wherein said objective-engaging structure's axis and said microscope-engaging structure's axis are at 90 degrees from each other.

* * * * *